United States Patent Office 3,309,536
Patented Mar. 14, 1967

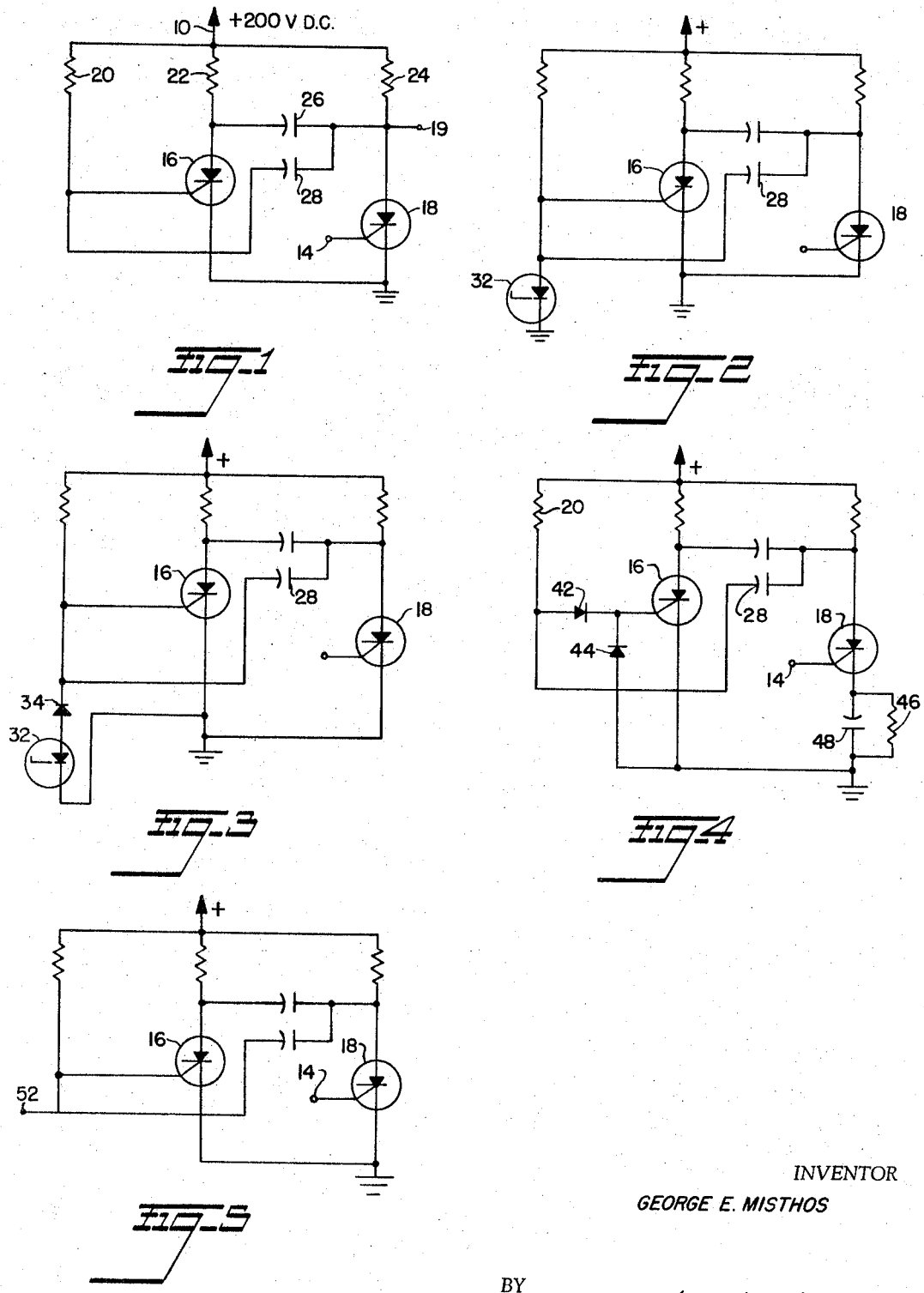

3,309,536
ONE-SHOT MULTIVIBRATOR CIRCUIT
George E. Misthos, Glenview, Ill., assignor to SCM Corporation, New York, N.Y., a corporation of New York
Filed Nov. 16, 1964, Ser. No. 411,504
9 Claims. (Cl. 307—88.5)

The present invention relates to means for applying electrical power to a load, and more particularly to a novel one-shot multivibrator circuit utilizing two silicon controlled rectifiers that may be utilized with a minimum of control circuitry to provide power for a predetermined amount of time.

The silicon controlled rectifier (SCR) is a four-layer, three P-N junction device which has thyratron-like characteristics, and such devices as are commercially available, have large current carrying capacities and therefore are desirable for many switching applications. It is known to employ such controlled rectifiers in parallel circuit arrangements together with a commutating capacitor interrupting current flow through one controlled rectifier circuit when the other is conducting. Such a circuit is shown for example in U.S. Patent No. 3,143,665.

The principal objects of this invention are to provide novel one-shot multivibrator circuits having a pair of alternatively operable controlled rectifiers arranged so that a minimum of external circuitry is required to actuate the circuit in response to pulse type signals received on one or more input leads, and further are capable of operating into load circuits that may have current requirements that vary over a considerable range.

Another object is to provide novel arrangements for protecting silicon controlled rectifiers in a one-shot multivibrator circuit against excessive reverse bias voltages that are coupled through the timing circuits when the circuit triggers from one mode of operation to the other.

These and other objects of the invention will become more fully apparent from the claims and from the description as it proceeds in connection with the drawings wherein:

FIGURE 1 is a circuit diagram of a basic one-shot multivibrator in accordance with the present invention; and FIGURES 2 through 5 are separate embodiments showing modifications of the basic circuit of this invention.

Referring now to FIGURE 1, the one-shot multivibrator circuit of this invention is adapted for use with a direct current power supply that provides a positive voltage on terminal 10 and a negative voltage which is here illustrated as ground. A first controlled rectifier (SCR) 16 and its load resistor 22 and a second controlled rectifier (SCR) 18 including its load resistor 24 are connected in parallel between the power supply terminals. The circuits are arranged so that one or the other is conducting by the provision of capacitor 26 which is connected to the junction between the load resistor and the respective anode terminals of the two controlled rectifiers.

Capacitor 28 and resistor 20 are connected as a series R-C circuit with one terminal of capacitor 28 connected to the junction of the anode terminal of SCR 18 and load resistor 24, and one terminal of resistor 20 connected to a point of fixed potential such as the positive terminal 10 of the power supply.

The gate terminal for SCR 16 is connected to the junction between resistor 20 and capacitor 28. The gate terminal of SCR may be connected directly to input terminal 14 where incoming positive going pulses or trigger voltages may be applied to operate this circuit.

When operating voltage is applied at the positive terminal 10, SCR 18 is normally cut off and SCR 16 is normally conducting by virtue of the connection of the gate of SCR 16 to the positive supply terminal through resistor 20. Capacitors 26 and 28 become charged to essentially the magnitude of the power supply voltage. Conduction through SCR 16 is due to current flowing through resistor 22 into the anode terminal of SCR 6, and also the current flowing through resistor 20 into the gate.

A trigger pulse applied on terminal 14 of the gate of SCR 18 causes SCR 18 to begin conducting heavily. Conduction of SCR 18 tends to reverse the polarity of the charge on capacitor 26 which is in parallel with SCR 16; capacitor 26 draws a charging current of such proportions through resistor 22 to cause conduction in SCR 16 to cut off. Capacitor 28 discharges at a slower rate than capacitor 26. As capacitor 28 is in parallel with the gate to cathode circuit of SCR 16, it holds the gate of SCR 16 negative so that conduction remains cut off while it is discharging. When capacitor 28 is sufficiently discharged, the gate of SCR 16, because of its connection to the positive supply terminal through resistor 20, becomes sufficiently positive to cause it to again fire. The firing of SCR 16 tends to reverse again the polarity of the charge on capacitor 26; this reversal effects the cut off of current flow through SCR 18 so that SCR 18 stops conducting. SCR 18 remains cut off until the next positive going pulse is received on lead 14.

Capacitor 26 which is connected across controlled rectifiers 16 and 18, acts to interrupt current flow through one of the rectifiers when the other fires. Capacitor 28, together with resistor 20, provides a circuit having an R-C time constant of a predetermined value greater than that of capacitor 26 and resistor 22. The greater the time constant of the series circuit including capacitor 28 and resistor, the longer the time interval that SCR 16 remains cut off after receipt of an input pulse on terminal 14. During the time SCR 18 conducts, current is available at terminal 19 for operating additional electronic and electro-mechanical devices of widely varying current requirements.

Typical operating values which have been found to give satisfactory performance with the illustrated circuit are as follows:

Operating voltage _____volts D.C.___ 200
Capacitor 26 _____microfarads__ 2
Capacitor 28 _____do__ 0.5
Resistors 22 and 24 _____ohms___ 1000
Resistor 20 _____do—— 10,000

Before timing capacitor 28 has discharged and with SCR 16 not conducting, a high negative going voltage develops at the reverse-biased junction at the gate of SCR 16, particularly at the moment conduction through SCR 18 is turned on. With higher voltage circuits, the excessive voltages at the reverse-biased junction may destroy the controlled rectifier and it is for this reason that means such as shown in FIGURES 2 and 3 be provided in circuit to prevent such high voltage build up.

In FIGURE 2 a Zener diode 32 is connected to one terminal of timing capacitor 28 and to a negative or ground potential to be effectively in parallel with the gate to cathode current path of SCR 16. Doide 32 thus limits the negative voltage at the gate of SCR 16.

In the embodiment of FIGURE 3, a further solid state diode 34 is shown connected in series with Zener diode 32. Diode 34 is poled in the opposite direction as compared with Zener diode 32. Conduction through the two diodes to discharge capacitor 28 begins when a minimum voltage, greater than the reverse-bias energy gap of diode 34, exists. Thus, the negative going voltage coupled to the gate of SCR 16 through capacitor 28 when SCR 18 is turned on is limited essentially to a value no greater than the reverse-bias energy gap of diode 34.

A further way of providing protection to SCR 16 resides in the use of a circuit like that shown in FIGURE 4 wherein a pair of diodes 42 and 44 are employed. In this embodiment, diode 42 is connected in series between the gate terminal of SCR 16 and the junction between timing capacitor 28 and resistor 20, and so poled, as illustrated to pass current in a direction necessary to cause SCR 16 to be normally conducting. Diode 44 is connected from the gate to a point of negative potential or ground, reversely poled, as illustrated, with respect to diode 42, and is effectively in parallel with the gate to cathode circuit of SCR 16. This combination of diodes provides effective protection for SCR 16 without interfering with the normal operation of the one-shot multivibrator circuit as described above. In some instances, depending on the operational characteristics of diode 42 and SCR 16, the protection of diode 44 may not be needed and can, therefore, be deleted from the circuit.

As also shown in FIGURE 4, resistor 46 may be added in the circuit to the cathode to accommodate a wider variation of loads in the anode circuit of SCR 18. If such a cathode resistance is used, a by-pass capacitor 48 is desirable to assure a sufficient initial current surge to cut off current conduction in SCR 16.

According to FIGURE 5, a second input terminal 52 may be connected also to the gate of SCR 16. If the incoming trigger signal on lead 52 is received while SCR 16 is cut off, SCR 16 will begin conducting and remain conducting until the next trigger arrives on input terminal 14. This arrangement provides the circuit with alternative means for controlling the firing of SCR 16 to provide added flexibility to the circuit of this invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A one-shot multivibrator comprising a source of direct current operating voltage having a positive terminal and a negative terminal, first and second controlled rectifiers one of which is normally conducting and the other of which is normally non-conducting, and each of which has an anode terminal connected to the positive terminal, a cathode terminal connected to the negative terminal and a gate terminal; first and second loads in series with the first and second controlled rectifiers respectively; means for providing a circuit where only one of said controlled rectifiers conducts at a time including a commutating capacitor connected to junctions between each load and its associated controlled rectifier, a resistor and a second capacitor connected together at a further junction to form a series circuit, a free terminal of the second capacitor being connected to the junction of the load and one rectifier and a free terminal of the resistor being connected to a point of fixed potential positive relative to the cathode terminal of said one rectifier; a circuit connection between said further junction and the gate terminal of the other rectifier; and means for actuating said multivibrator circuit comprising input signal pulses applied to the gate terminal of said one rectifier.

2. The multivibrator as defined in claim 1 including means connected between said further junction and a point of reference potential to protect said other rectifier from damage resulting from high reverse bias voltages.

3. The multivibrator as defined in claim 2 wherein said last mentioned means is a Zener diode.

4. The multivibrator as defined in claim 2 wherein said last mentioned means is the combination of a Zener diode and a solid state diode connected in series, but poled in opposite directions.

5. The multivibrator as defined in claim 2 wherein said last mentioned means comprises a pair of solid state diodes connected in series and poled in opposite directions, and wherein the gate of said other rectifier is connected to said further junction through only one of said diodes.

6. A one-shot multivibrator comprising a source of direct current operating voltage having a positive terminal and a negative terminal, first and second controlled rectifiers each having an anode terminal connected to the positive terminal, a cathode terminal connected to the negative terminal and a control terminal; first and second load resistors connected in series between the anode terminals of the first and second controlled rectifiers and the positive power supply terminal; means for providing a circuit where only one of said controlled rectifiers conducts at a time including a commutator capacitor having two terminals, one each of which is connected to junctions between each load resistor and its associated anode terminal, and a resistor and a timing capacitor connected together at a further junction to form a series R-C circuit having a time constant greater than the time constant of the commutator capacitor and its charging circuit, a free terminal of the timing capacitor being connected to the junction of the load resistor and the anode terminal of one rectifier and a free terminal of the resistor being connected to a point of fixed potential that is positive relative to the cathode potential of the other rectifier; a circuit connection between said further junctioin and the gate terminal of the other rectifier; means connected to said further junction for protecting said other rectifier from high reverse bias voltages; circuit means connecting to the gate terminal of said one rectifier to normally maintain said one rectifier in a non-conducting condition excepting for the time interval when said other rectifier is in a non-conducting condition; and means for actuating the one-shot multivibrator circuit by applying successive input signal pulses to the gate terminal of said one rectifier.

7. The multivibrator as defined in claim 6 wherein said rectifier protecting means is a Zener diode.

8. The multivibrator as defined in claim 6 wherein said rectifier protecting means is the combination of a Zener diode and a solid state diode connected in series, but poled in opposite directions.

9. The multivibrator as defined in claim 6 wherein said rectifier protecting means comprises a pair of solid state diodes connected in series and poled in opposite directions, and wherein the gate of said other rectifier is connected to said further junction through only one of said diodes.

References Cited by the Examiner

UNITED STATES PATENTS

| 3,129,367 | 4/1964 | Der _____ | 307—88.5 |
| 3,201,679 | 8/1965 | Buchanan et al. _____ | 307—88.5 |
| 3,217,182 | 11/1965 | Scott _____ | 307—88.5 |
| 3,218,476 | 11/1965 | Hansson _____ | 307—88.5 |
| 3,237,109 | 2/1966 | Minard _____ | 328—210 |

FOREIGN PATENTS 1,087,087  8/1954  France.

OTHER REFERENCES

"A Survey of Some Circuit Applications of the Silicon Controlled Switch and Silicon Controlled Rectifier," in Solid State Products, Inc., Bulletin D420-02-12-59. Effective Date December 1959, pp. 16 and 17 relied on.

G. E. Publication "Phase-Controlling Kilowatts with Silicon Semiconductors," by F. W. Gutzwiller, 1st page. Reprinted from May 1959 Issue of Control Engineering.

ARTHUR GAUSS, *Primary Examiner.*

R. H. EPSTEIN, *Assistant Examiner.*